(12) United States Patent
Kun et al.

(10) Patent No.: US 11,171,493 B2
(45) Date of Patent: Nov. 9, 2021

(54) WIRELESS PARALLEL CHARGING

(71) Applicant: QUALCOMM Incorporated, San Diego, CA (US)

(72) Inventors: Cheong Kun, San Diego, CA (US); Guoyong Guo, San Jose, CA (US); Curtis Gong, San Diego, CA (US); Kalpesh Shetye, San Diego, CA (US); Georgios Konstantinos Paparrizos, Foster City, CA (US); Todd Sutton, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 16/407,038

(22) Filed: May 8, 2019

(65) Prior Publication Data

US 2019/0348849 A1 Nov. 14, 2019

Related U.S. Application Data

(60) Provisional application No. 62/669,311, filed on May 9, 2018.

(51) Int. Cl.
*H02J 7/00* (2006.01)
*H02J 7/02* (2016.01)

(52) U.S. Cl.
CPC ............. *H02J 7/00* (2013.01); *H02J 7/025* (2013.01); *H02J 2207/20* (2020.01)

(58) Field of Classification Search
CPC . H02M 2001/0009; H02M 2001/0016; H02M 2001/0045; H02M 2003/1566; H02M 3/285; H02M 1/0016; H02M 1/0009; H02M 1/0045; H02M 1/007; H02M 3/1566; H02M 3/07; H02M 3/158; H02J 7/00; H02J 7/025; H02J 2207/20; H02J 50/10; H02J 1/102
USPC .......................................... 307/151; 320/108
See application file for complete search history.

(56) References Cited

U.S. PATENT DOCUMENTS

2012/0293021 A1* 11/2012 Teggatz .................... H02J 7/00
307/151
2015/0145497 A1 5/2015 Torres et al.

FOREIGN PATENT DOCUMENTS

CN 106787055 A 5/2017
CN 107947305 A 4/2018

OTHER PUBLICATIONS

International Search Report and Written Opinion—PCT/US2019/031601—ISA/EPO—dated Jul. 26, 2019.

* cited by examiner

*Primary Examiner* — Paul Dinh
(74) *Attorney, Agent, or Firm* — Seyfarth Shaw LLP (57) ABSTRACT

A battery charging circuit includes a buck converter, a charge pump power converter, a sensor external to or internal to the battery charging circuit, and a control unit. The charge pump power converter includes an output coupled to an output of the buck converter for charging a battery. The sensor is configured to sense a total input current. The control unit receives the total input current that is sensed and compensates for a variation in an input current to the charge pump power converter based on whether the total input current meets a specified current variance.

18 Claims, 9 Drawing Sheets

WIRELESS PARALLEL CHARGING

CROSS-REFERENCE TO RELATED APPLICATION

The present application claims the benefit of U.S. Provisional Patent Application No. 62/669,311, filed on May 9, 2018, and titled "WIRELESS PARALLEL CHARGING," the disclosure of which is expressly incorporated by reference herein in its entirety.

TECHNICAL FIELD

The present disclosure generally relates to electronic circuits. More specifically, the present disclosure relates to wireless parallel battery charging.

BACKGROUND

Power management integrated circuits (power management ICs or PMICs) are used for managing the power specification of a host system. A PMIC may be used in battery-operated devices, such as mobile phones, tablets, laptops, wearables, etc., to control the flow and direction of electrical power in the devices. The PMIC may perform a variety of functions for the device such as DC-to-DC conversion, battery charging, power-source selection, voltage scaling, power sequencing, etc. In some cases, the PMIC may include parallel battery charging circuits.

SUMMARY

A battery charging circuit includes a buck converter, a charge pump power converter, a sensor external to or internal to the battery charging circuit, and a control unit. The charge pump power converter includes an output coupled to an output of the buck converter for charging a battery. The sensor is configured to sense a total input current. The control unit receives the total input current that is sensed and compensates for a variation in an input current to the charge pump power converter based on whether the total input current meets a specified current variance.

A battery charging method includes wirelessly receiving a charge current to charge a battery of a device. The method also includes sensing the charge current. The method further includes determining, at a buck converter, whether a variation in the charge current that is sensed meets a specified current variance. Furthermore, the method includes compensating for the variation based on whether the charge current that is sensed meets the specified current variance.

A battery charging circuit includes a buck converter, a charge pump power converter, and a sensor external to or internal to the battery charging circuit. The charge pump power converter includes an output coupled to an output of the buck converter for charging a battery. The sensor is configured to sense a total input current. The battery charging circuit further includes means for compensating for a variation in an input current to the charge pump power converter based on whether a received total input current that is sensed meets a specified current variance.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

In order to charge a battery in a portable device, a battery charging circuit may be utilized. For certain aspects, the battery charging circuit may reside in a power management integrated circuit (PMIC) or be a stand-alone integrated circuit component. The battery charging circuit may include two or more parallel charging circuits, each capable of charging the battery, which may be connected together and to the battery in an effort to provide fast charging of the battery. Example parallel battery charging circuits are described in U.S. Pat. No. 9,590,436 to Sporck et al., filed Apr. 11, 2014, and entitled "Master-Slave Multi-Phase Charging," the disclosure of which is expressly incorporated by reference herein in its entirety. Two example parallel charging architectures include connection of: (1) a universal serial bus input (USBIN) or proprietary input (e.g., direct current input (DCIN)) terminal on the master charging circuit to an input voltage (VIN) terminal on the slave charging circuit (VIN_s) (referred to as a "USBIN-VIN configuration"); or (2) An input of the slave charger (which is a node between an integrated current sensor (e.g., a current-sensing front-porch field-effect transistor (FET)) and a charger buck high-side FET) on the master charging circuit (MID_m) to a MID terminal on the slave charging circuit (MID_s) (referred to as a "MID-MID configuration"). Conventional charging circuits, like those described in U.S. Pat. No. 9,590,436, for a parallel charger may use buck converter topologies.

Battery charging systems are trending towards higher charging current, which leads to a desire for higher efficiency converters that can operate over a wider battery voltage range. To achieve increased charging with a wireless input, it may be desirable to operate such battery charging systems with higher efficiency.

Charge pump power converters may provide a more efficient alternative to buck converters. For example, a charge pump power converter coupled with a wireless receiver may be used to achieve charge current regulation.

Aspects of the present disclosure are directed to parallel battery charging. In one aspect, a buck converter and a charge pump are used for the wireless parallel battery charging operation, to achieve high efficiency and stable charging with a wireless input. In one aspect, the battery charging circuit includes a buck converter, a charge pump power converter, a sensor external to or internal to the battery charging circuit and a control unit. The sensor being an external or an internal sensor (e.g., external or internal current sensor). The charge pump power converter includes an output coupled to an output of the buck convert for charging a battery. The external or internal sensor senses a total input (e.g., total input current). The control unit receives the sensed total input current and compensates for a variation in the input current to the charge pump power converter based on whether the sensed total input current meets a specified current variance. This parallel charging circuit may perform current balancing by adjusting a duty cycle for the switches in the buck converter (e.g., a buck duty cycle) and the input current for the charge pump power converter.

In operation, a master buck charger (e.g., the buck converter) senses a total input current ($I_{IN}$) via an internal or external field-effect transistor and regulates a total input current via an analog loop by adjusting the buck duty cycle. A slave charge pump (e.g., the charge pump) provides a high efficiency charging path in parallel with the master buck charger.

Figure 1:
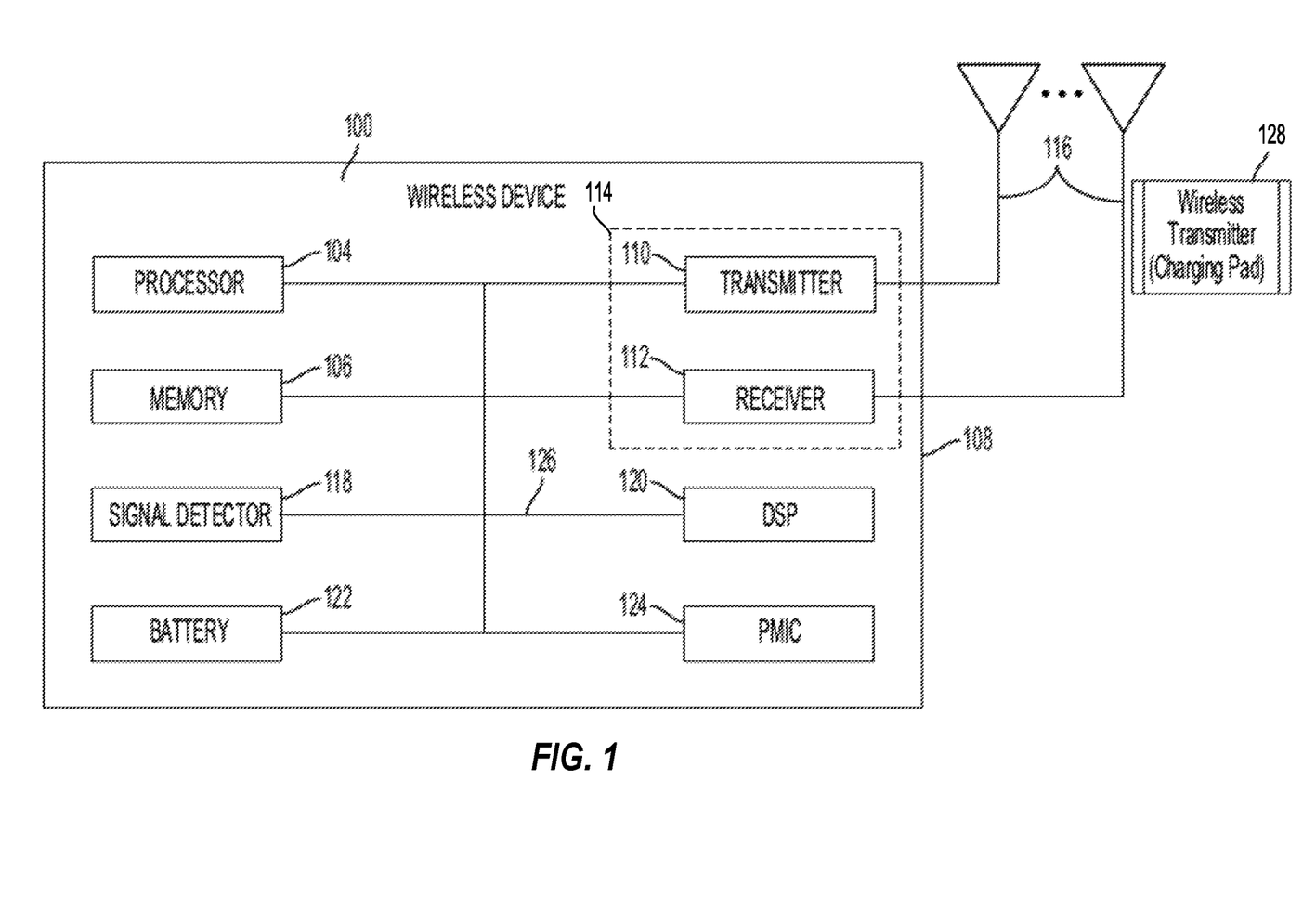
FIG. 1 illustrates a block diagram of an example device that includes a battery charging circuit, according to certain aspects of the present disclosure.

For example, wireless parallel battery charging may be implemented in a device as shown in FIG. 1. FIG. 1 illustrates an example device 100 in which aspects of the present disclosure may be implemented. The device 100 may be a battery-operated device such as a cellular phone, a personal digital assistant (PDA), a handheld device, a wireless device, a laptop computer, a tablet, a smartphone, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 performs logical and arithmetic operations based on program instructions stored within the memory 106.

In certain aspects, the device 100 may also include a housing 108 that may include a transmitter 110 and a receiver 112 to allow transmission and reception of data and power between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used to detect and quantify the level of signals received by the transceiver 114. The signal detector 118 may detect signal parameters such as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 may include a battery charging circuit (e.g., a wireless parallel battery charging circuit), as described below, or be a dedicated battery charging integrated circuit component. The various components of the device 100 may be coupled together by a bus system 126, which may include a power bus, a control signal bus, and/or a status signal bus in addition to a data bus. The wireless device 100 may be charged by a wireless transmitter 128 that is external to the wireless device 100. For example, the wireless transmitter 128 may include a charging pad that provides power to the wireless device 100 via a receiver (e.g., the receiver 112) of the wireless device 100.

Figure 2:
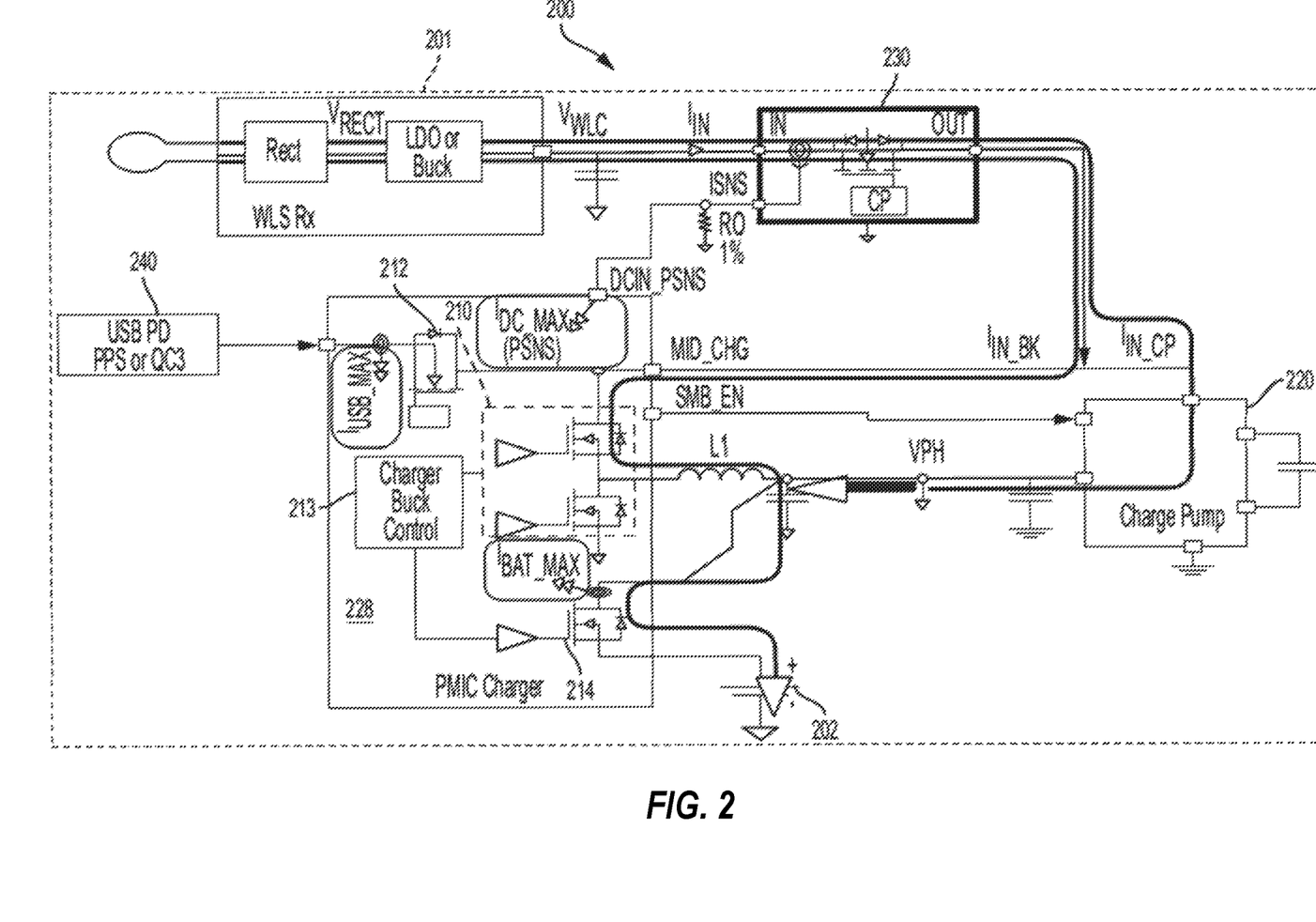
FIG. 2 is a block diagram of an example wireless parallel battery charging circuit with a buck converter and a charge pump power converter for charging a battery, in accordance with certain aspects of the present disclosure.

FIG. 2 is a block diagram of an example wireless parallel battery charging circuit 200 including a buck converter and a charge pump power converter 220 for charging a battery 202, in accordance with certain aspects of the present disclosure. In some aspects, multiple charge pump power converters may be connected or coupled together to increase power output during wireless charging. The buck converter includes a buck switcher 210 and an inductor L1. The charge pump power converter 220 can achieve much higher efficiency (~97%) than a general buck converter. Furthermore, the charge pump power converter 220 may not include an inductor and, thus, may offer a smaller solution (less real estate or physical area) than the buck converter. The charging circuit 200 performs an actual wireless parallel charging of the battery 202 using both the buck converter and the charge pump power converter 220.

The criterion on which the parallel charging is based is a current balance between the buck converter and the charge pump power converter 220. In order to achieve current balance (e.g., by maintaining a stable input current $I_{IN}$), the system operates on the input voltage (for the charge pump power converter 220) and on a duty cycle (for the buck converter). An input voltage $V_{IN}$ or $V_{WLS}$ and a corresponding input current $I_{IN}$ are subject to high variation that destabilize the charging system or wireless parallel battery charging circuit 200. For example, the master buck charger (e.g., the PMIC 228 or the buck converter) can sense input current $I_{IN}$ and adjust the buck duty cycle to change an input current $I_{IN}$ to a buck converter $I_{IN\_BK}$ and regulate the input current $I_{IN}$ (input current $I_{IN}$=buck converter $I_{IN\_BK}$+charge pump input current $I_{IN\_CP}$) to a desired value. The input voltage $V_{WLS}$ may be an input voltage to the charge pump power converter 220 and to the buck converter or a power management integrated circuit (PMIC) 228 (or PMIC charger) in which the buck converter is integrated. This input voltage $V_{WLS}$ is also an output voltage of a wireless receiver 201 configured to wirelessly receive charge signals (voltage or current) for the wireless parallel battery charging circuit 200. Similarly, the input current $I_{IN}$ is an output current of the wireless receiver 201.

An external sensor 230 (e.g., an external current sensor, an integrated current sensor or an external current sense FET)) coupled to the wireless receiver 201, may sense the input current $I_{IN}$ at the output of the wireless receiver 201. While the external sensor 230 is external to the PMIC 228, the sensor may be internal to the PMIC 228 in some configurations. The PMIC 228 may be similar to the PMIC 124, shown in FIG. 1. The external sensor 230 senses the input current $I_{IN}$ and communicates information associated with the sensed input current $I_{IN}$ to the PMIC 228. For example, the information associated with the sensed input current IIN may be provided to a control unit 213 (e.g., a charger buck control device that includes a duty cycle adjustment device) in the PMIC 228. The wireless parallel battery charging circuit 200 may also include a wired charging aspect. For example, the PMIC 228 may include an internal sensor 212 (e.g., an integrated current sensor integrated in the PMIC or charger/front porch field-effect transistor (FPFET) or integrated sense resistor, for example) coupled to a wired charger 240 (e.g., a universal serial bus power delivery (USB PD) quick charge 3.0 or other variable voltage charge method, a programmable power supply (PPS), or other original equipment manufacturer based chargers). The FPFET may be internal to the PMIC 228.

In order to achieve current balance, the wireless parallel battery charging circuit 200 operates on the input current $I_{IN}$ (for the charge pump power converter 220 and the buck converter) and on the duty cycle (for the buck converter). For example, the external sensor 230 senses the input current $I_{IN}$ and provides information associated with the sensed input current $I_{IN}$ to the control unit 213. The control unit 213 causes a duty cycle for the buck converter (e.g., the duty cycle of the buck switcher 210 of the buck converter) to be adjusted (e.g., increased, decreased, or maintained) to balance the current between the buck converter and the charge pump power converter 220. The duty cycle is adjusted (via an analog loop) to cause the buck switcher 210 to draw more current (e.g., more input current to the buck converter $I_{IN\_BK}$) or less current (e.g., less input current to the buck converter $I_{IN\_BK}$) to the buck converter while maintaining a total input current $I_{IN}$. The total input current $I_{IN}$ may be maintained at least within a specified current variance. For example, the master buck charger (e.g., the PMIC 228 or the buck converter) can sense input current $I_{IN}$ and adjust the buck duty cycle to change an input current to the buck converter $I_{IN\_BK}$ and regulate input current $I_{IN}$ (input current $I_{IN}$=buck converter $I_{IN\_BK}$+charge pump input current $I_{IN\_CP}$) to a desired value.

The duty cycle is controlled by the control unit 213 based on variations to the sensed input current $I_{IN}$. The control of the duty cycle may also be based on current flowing through a battery field-effect transistor (BATFET) 214 in the PMIC 228. The current flowing through the BATFET 214 is a total output current, which is a sum of an output current of the buck converter and an output current of the charge pump power converter 220.

Figure 3:
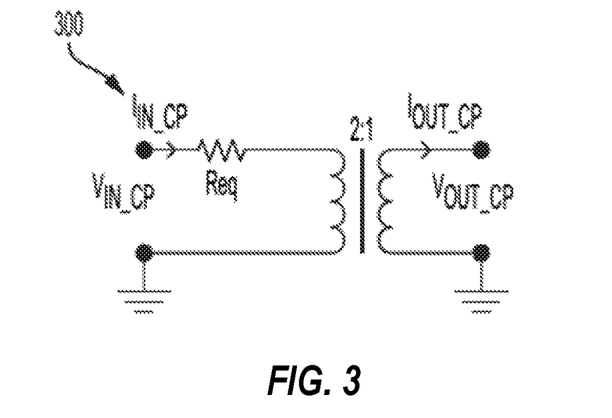
FIG. 3 is an exemplary circuit diagram representative of an example charge pump power converter, in accordance with certain aspects of the present disclosure.

FIG. 3 is a model or a circuit diagram 300 representative of an example charge pump power converter (e.g., the charge pump power converter 220 of FIG. 2), in accordance with certain aspects of the present disclosure. It is noted that the circuit of FIG. 3 is only representative of one possible configuration. Other configurations may include multiple charge pumps, and/or combinations of charge pumps and buck converters. In some configurations, one or more charge pumps are swapped for one or more buck converters so that the main charger may include one or more charge pumps, one or more buck converters, or a combination thereof. The charge pump power converter 220 is very sensitive to the input voltage $V_{WLS}$. This follows because for wireless charging, the input voltage $V_{WLS}$, which is the output of the wireless receiver 201, is highly unstable. For example, positioning and proximity change of a receive coil of a wireless receiver (e.g., the receiver 112 of FIG. 1) relative to a transmit coil of a wireless transmitter (e.g., the wireless transmitter 128 that is external to the wireless device 100) can result in changes to the input voltage $V_{IN\_CP}$ of the charge pump. For example, this model of the charge pump divides input voltage by 2 and doubles input current by 2.

With this circuit, the input current $I_{IN}$ to the charge pump power converter 220 may be represented by the following equation:

$$I_{IN\_CP} = I_{OUT\_CP}/2 = \frac{V_{IN\_CP} - 2V_{OUT\_CP}}{R_{eq}},$$

where $R_{eq}$ represents the losses for the charge pump power converter and $V_{IN\_CP}$ and $V_{OUT\_CP}$ are the input and output voltages of the charge pump. Due to a small $R_{eq}$ (~50 milliohm), a small change in the input voltage $V_{IN\_CP}$ of the charge pump can result in a large change in the charge pump input current $I_{IN\_CP}$ and output current $I_{OUT\_CP}$. Moreover, some open interface standards that define wireless power transfer using inductive charging over distances (e.g., Qi standard) specify that communications between receivers and transmitters is via a load modulation method. This specification may subject the input voltage $V_{IN}$ or $V_{WLS}$ to ripple. For example, the specification may add a square wave as high as 100 millivolts peak-to-peak on top of the input voltage $V_{IN}$. These defects result in a high variation of the input current $I_{IN}$ to the charge pump power converter 220 and the buck converter and destabilization of a charging system to a point where the charge pump can be shut down. However, having the buck converter enabled in parallel with the charge pump power converter for wireless charging may help stabilize the charge pump power converter. Therefore, conditions that may limit or disable the charge pump power converter may be less likely to occur. In one aspect of the present disclosure, the charge pump power converter 220 includes a multi-level buck converter, a charge pump, or a combination thereof.

Figure 4:
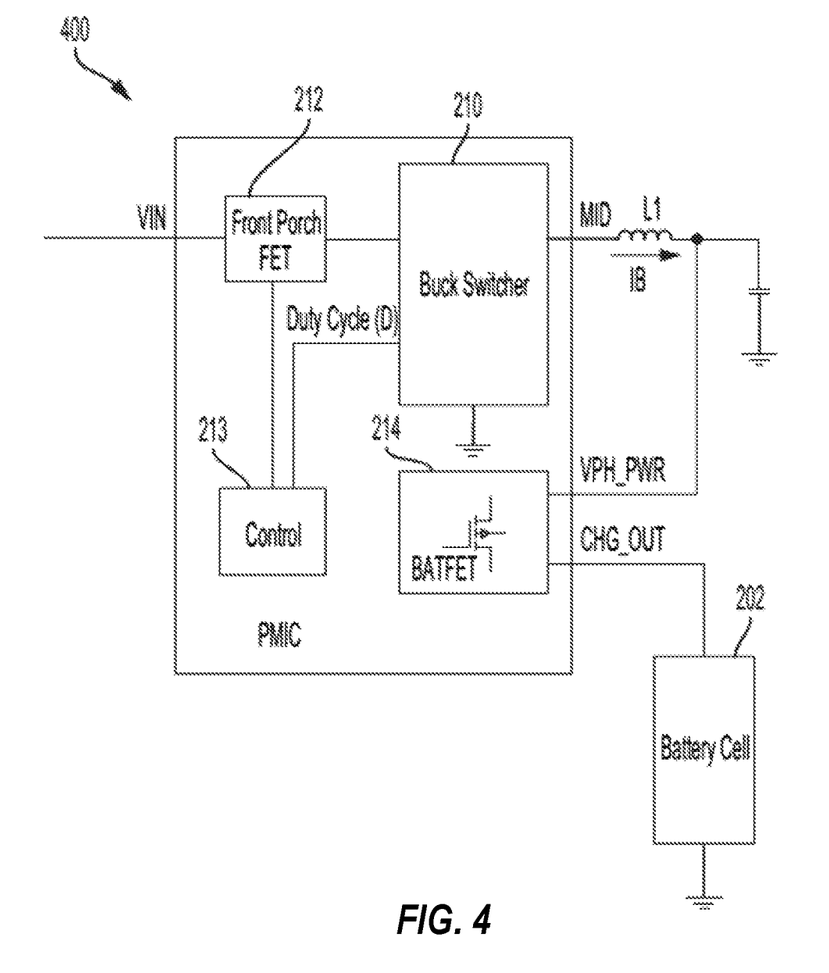
FIG. 4 is a block diagram of an example charging circuit using a buck converter for charging a battery, in accordance with certain aspects of the present disclosure.

FIG. 4 is a block diagram of an example charging circuit 400 using a buck converter topology for charging a battery 202, in accordance with certain aspects of the present disclosure. For illustrative purposes, some of the labelling and numbering of the devices and features of FIG. 4 are similar to those of FIG. 2. The output current of the buck converter (IB) is dictated by its duty cycle (D). The duty cycle is controlled by the control unit 213 based on the current flowing through the battery field-effect transistor (BATFET) 214. The current flowing through the BATFET 214 is a total output current (IT), which is a sum of the buck converter output current (IB) and the charge pump power converter output current ($I_{OUT\_CP}$), as illustrated in FIG. 2. The buck converter output current is proportional to the duty cycle.

Figure 5A:
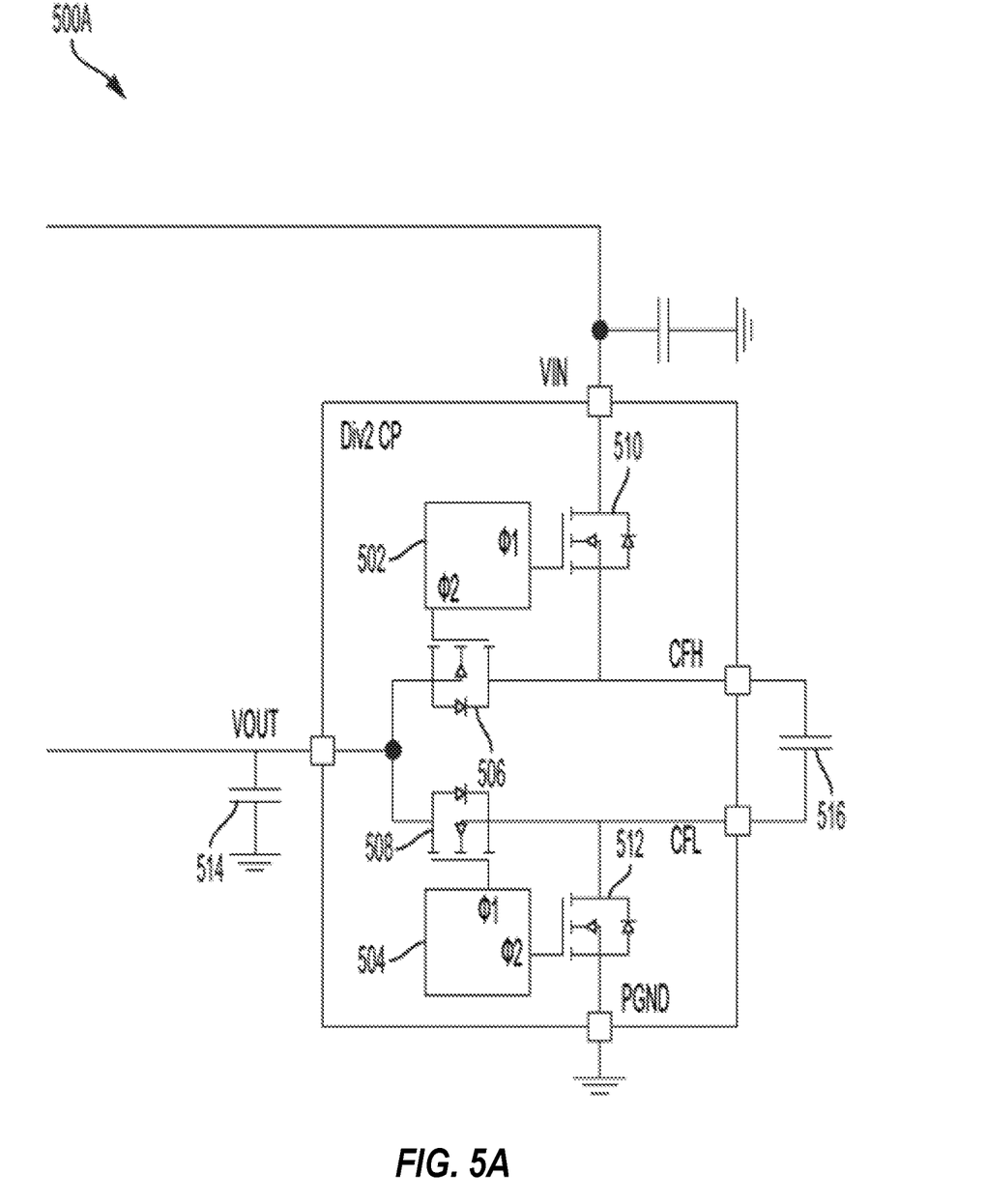
FIG. 5A is a circuit diagram representative of a charge pump power converter, in accordance with certain aspects of the present disclosure.

FIG. 5 is a circuit diagram 500A representative of a charge pump power converter, in accordance with certain aspects of the present disclosure. The circuit diagram 500A includes a first set of field-effect transistors 508 and 510, a second set of field-effect transistors 506 and 512, and logic circuits 502 and 504. In one aspect, the first set of field-effect transistors 508 and 510 are closed during the charging phase (e.g., phase 1). For example, during the charging phase, a fly capacitor 516 is charged. Each of the first set of field-effect transistors 508 and 510 is in series with an output capacitor 514 of the charge pump. In some aspects, the charge pump may include a multi-phase (e.g., dual phase) charge pump having multiple fly capacitors.

In some aspects, the second set of field-effect transistors 506 and 512 are closed during the discharging phase (e.g., phase 2). For example, during the discharging phase, the fly capacitor 516 is connected in parallel with the output capacitor 514 of the charge pump via the second set of field-effect transistors 506 and 512, and the output capacitor 514 and the fly capacitor 516 are discharged. The logic circuits 502 and 504 control the first set of field-effect transistors 508 and 510 as well as the second set of field-effect transistors 506 and 512 for each phase (50% duty cycle, on/off).

Figure 5B:
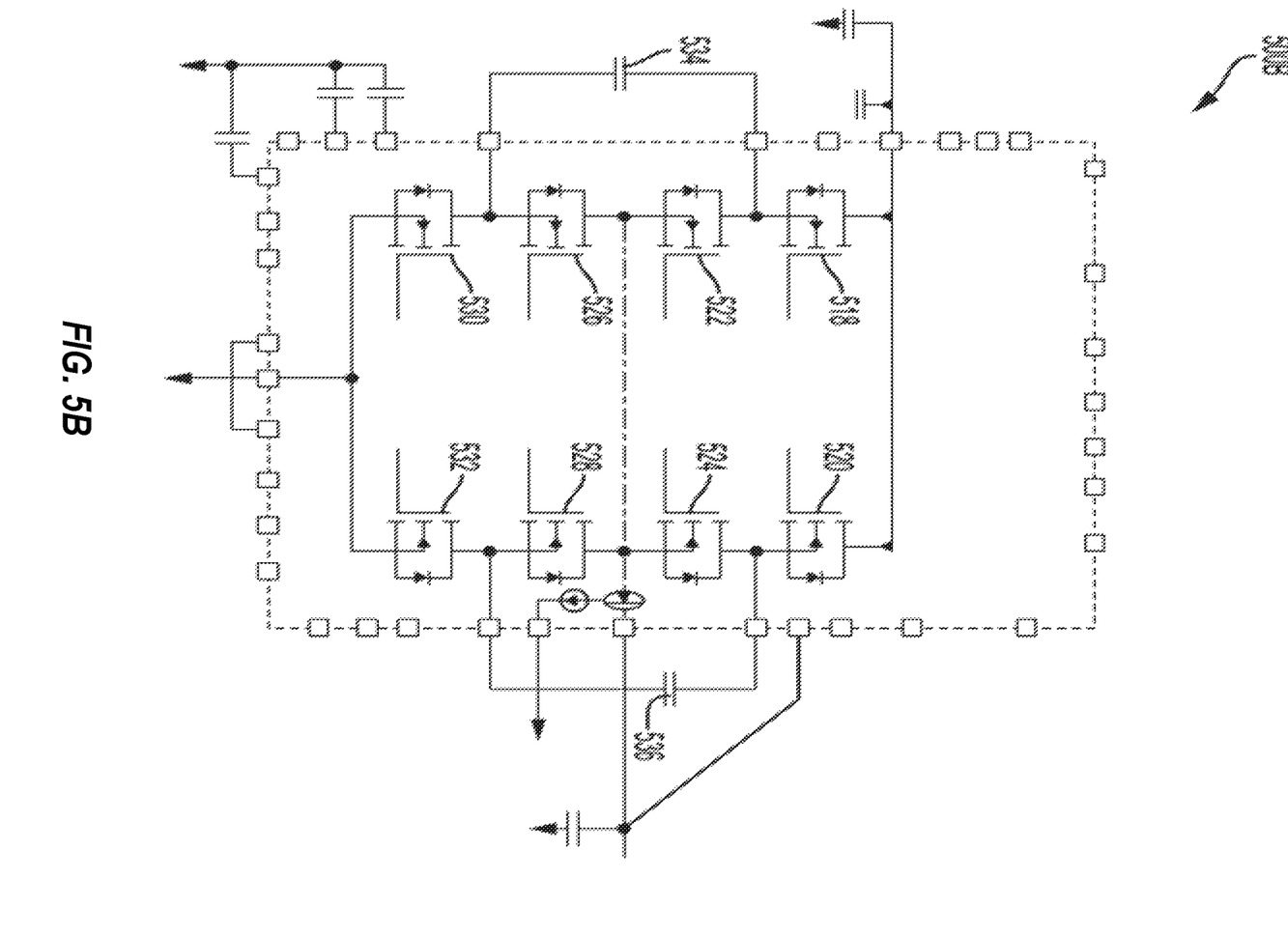
FIG. 5B is a circuit diagram representative of another charge pump power converter, in accordance with certain aspects of the present disclosure.

FIG. 5B is a circuit diagram 500B representative of a dual phase pump converter, in accordance with certain aspects of the present disclosure. The circuit diagram 500B includes field-effect transistors 518-532. Some of the field-effect transistors 518-532 are closed during the charging phase (e.g., phase 1) and others are closed during the discharging. For example, during the charging phase, a first fly capacitor 534 and/or a second fly capacitor 536 are charged.

Figure 6:
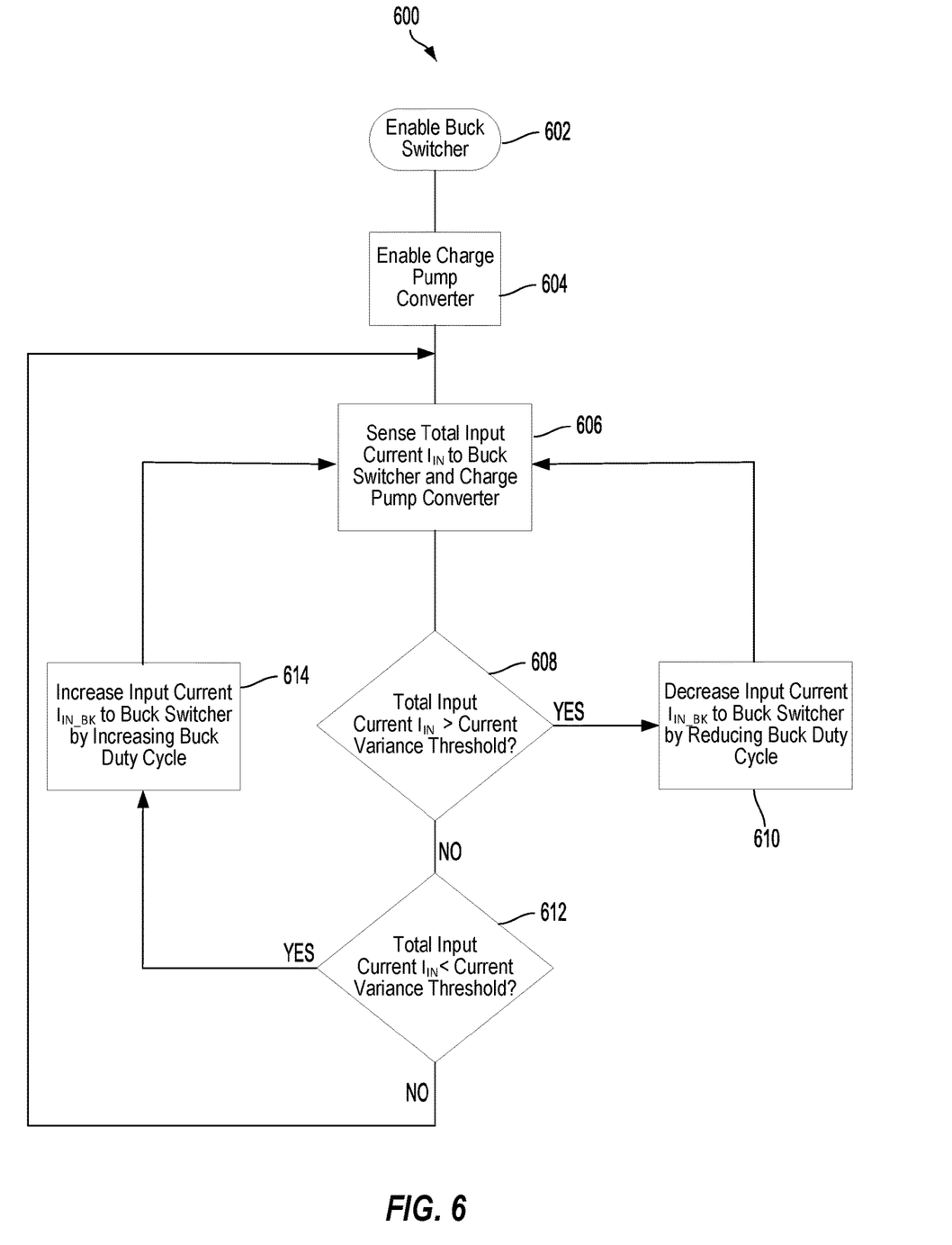
FIG. 6 is a flow diagram of example operations for controlling a wireless parallel charging circuit having a buck converter and a charge pump power converter to achieve current balance, in accordance with aspects of the present disclosure.

FIG. 6 is a flow diagram of example operations 600 for controlling a wireless parallel charging circuit having a buck converter and a charge pump power converter to achieve current balance, in accordance with aspects of the present disclosure.

A fast charge current setting of the buck converter may be set to a desired charge current. For example, the fast charge current may be set based on a current charge of the battery, a charge capacity of the battery, current operations supported by the battery, and the wireless parallel battery charging circuit 200 (of FIG. 2).

The buck switcher 210 and the charge pump power converter 220 are enabled for wireless parallel charging according to aspects of the present disclosure to achieve high efficiency and stable wireless charging. For example, the process starts at block 602 where the buck switcher 210 is enabled and continues to block 604 where the charge pump power converter 220 is enabled. A master buck charger (e.g., the PMIC 228 or the buck converter) senses a total input current $I_{IN}$ via an internal or external sensor 230 or field-effect transistor. The total input current $I_{IN}$ is shared between the buck converter and the charge pump power converter 220. For example, the total input current $I_{IN}$ is a sum of the input current $I_{IN\_BK}$ to the buck converter and the input current $I_{IN\_CP}$ to the charge pump power converter 220.

At block 606, the external sensor 230 senses the total input current $I_{IN}$. For example, the external sensor 230 senses the total input current $I_{IN}$ to the buck switcher and charge pump power converter 220 and provides information associated with the sensed input current $I_{IN}$ to the control unit 213. At block 608, the control unit 213 determines whether the total input current $I_{IN}$ is greater than a specified current variance (e.g., a specified current variance threshold). The variance in the total input current $I_{IN}$ may be a result of a change or variance in the input current $I_{IN\_CP}$ for the charge pump power converter 220.

The control unit 213 regulates the total input current $I_{IN}$v via an analog loop by adjusting a duty cycle of the buck converter based on the determination at block 608. When the total input current $I_{IN}$ is outside of the specified current variance, the buck duty cycle is adjusted such that the buck converter draws more current or less current to compensate for the change or variance in the input current $I_{IN\_CP}$ to the charge pump power converter 220. For example, at block 610, the input current $I_{IN\_BK}$ to the buck converter or buck switcher 210 is decreased (e.g., by reducing the buck duty cycle) when the total input current $I_{IN}$ is greater than the specified current variance to compensate for the increase in the input current $I_{IN\_CP}$ to the charge pump power converter 220. The process continues to block 606 where the external sensor 230 senses the total input current $I_{IN}$.

When the total input current $I_{IN}$ is not above the specified current variance, the process continues to block 612 where it is determined whether the total input current IN is less than the specified current variance. At block 614, the input current $I_{IN\_BK}$ to the buck converter or buck switcher 210 is increased (e.g., by increasing the buck duty cycle) when the total input current $I_{IN}$ is less than the specified current variance to compensate for a corresponding reduction in the input current $I_{IN\_CP}$ to the charge pump power converter 220. The process continues to block 606 where the external sensor 230 senses the total input current $I_{IN}$. When the total input current $I_{IN}$ is within the specified current variance, the operation of the wireless parallel battery charging circuit 200 is maintained. For example, the process continues to block 606 where the external sensor 230 continues to sense the total input current $I_{IN}$.

Figure 7:
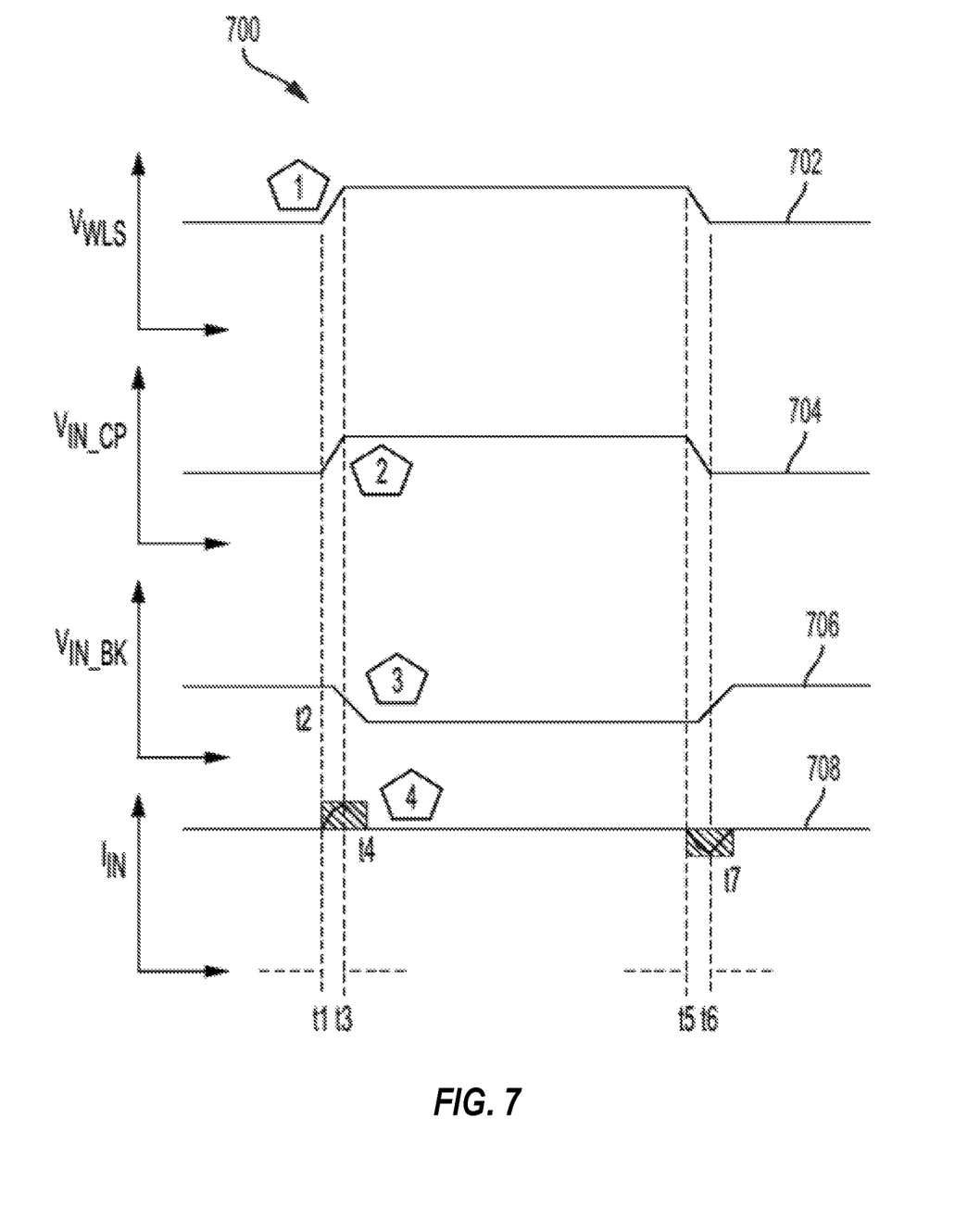
FIG. 7 illustrates exemplary plots including input voltage, input current to a charge pump power converter, input current to a buck converter, and total input current with respect to time for an example wireless parallel charging circuit, in accordance with aspects of the present disclosure.

FIG. 7 illustrates exemplary plots including input voltage $V_{WLS}$, input current $I_{IN\_CP}$ to the charge pump power converter 220, input current $I_{IN\_BK}$ to the buck converter or buck switcher 210, and total input current $I_{IN}$ with respect to time (plots 702, 704, 706, and 708, respectively) for an example wireless parallel charging circuit. In one aspect of the disclosure, buck converter or buck switcher 210 may be a multi-level buck converter, a charge pump, or a combination thereof. The charge pump may be a multi-phase/level charge pump.

The input voltage $V_{IN}$ or $V_{WLS}$, which is the output voltage of the wireless receiver 201, and the corresponding input current $I_{IN}$, which is the output current of the wireless receiver 201, to be adjusted are subject to high variation that destabilize the charging system or circuit 200. The high variation in the input voltage $V_{WLS}$ is represented by the increase in voltage between times t1 and t5 in plot 702. The variation in the input voltage $V_{WLS}$ may be due to Qi specifications and/or the positioning and proximity change of a receive coil associated with the wireless receiver 201 of a device (e.g., the device 100 of FIG. 1) relative to a transmit coil of a wireless transmitter (not shown) of the device.

The charge pump power converter 220 is very sensitive to the input voltage $V_{WLS}$. For example, the variation in the input voltage $V_{WLS}$ causes high variation of the input current $I_{IN\_CP}$ to the charge pump power converter 220. The high variation of the input current $I_{IN\_CP}$ to the charge pump power converter 220 is represented by the increase in current between times t1 and t5 in plot 704.

The external sensor 230 senses the total input current $I_{IN}$ and communicates information associated with the sensed input current $I_{IN}$ to the buck master charger (e.g., PMIC or PMIC charger 228). The buck master charger (including the control unit 213) quickly compensates for the high variation in the input current $I_{IN\_CP}$ to the charge pump power converter 220 by adjusting the input current $I_{IN\_BK}$ to the buck switcher 210 via an analog control loop to keep the total input current $I_{IN}$ stable, as shown in plots 706 and 708.

The adjustment (e.g., reduction) in the input current $I_{IN\_BK}$ to the buck switcher 210 is shown in plot 706 between a time after t1 (e.g., t2) that illustrates that the compensation starts after the detection of the variation in the total input current $I_{IN}$ or corresponding input voltage $V_{WLS}$ and a time after t6 (e.g., t7). For example, the compensation is enabled such that at t2, the buck compensates the $I_{IN\_CP}$ increase by reducing $I_{IN\_BK}$. At t6, the buck compensates the $I_{IN\_CP}$ reduction by increasing $I_{IN\_BK}$. Plot 708 illustrates that the adjustment in the input current $I_{IN\_BK}$ to the buck switcher 210 causes the total input current $I_{IN}$ to be maintained. However, slight changes in the total input current $I_{IN}$ occur between times t1 and t4 and between times t5 and t7. This is due to an inherent delay in generating an adjustment in the input current $I_{IN\_BK}$ in response to the sensed variation in the total input current $I_{IN}$ and a delay after the variation in the total input current $I_{IN}$ subsides.

With this parallel charging circuit topology as illustrated in the circuit 200 of FIG. 2, the buck converter or buck master charger acts as a shock absorber and increases the stability of the charging system.

Figure 8:
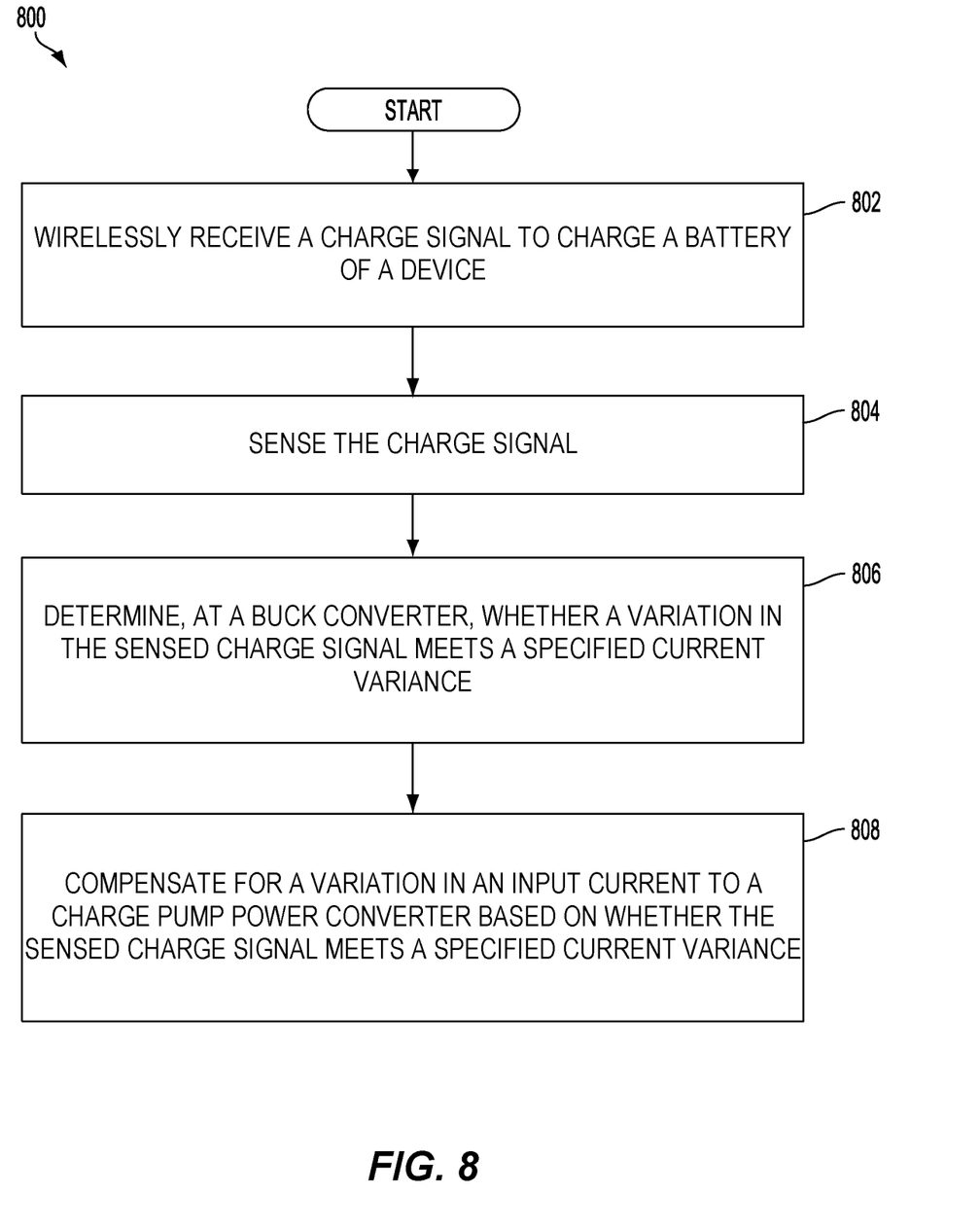
FIG. 8 depicts a simplified flowchart of a wireless battery charging method, in accordance with aspects of the present disclosure.

FIG. 8 depicts a simplified flowchart of a wireless battery charging method 800. At block 802, a wireless parallel battery charging circuit (e.g., the wireless receiver 201 of the wireless parallel battery charging circuit 200) wirelessly receives a charge signal to charge a battery of a device. At block 804, the charge signal is sensed by, for example, the external sensor 230. At block 806, it is determined, at a first charging circuit including a buck converter, whether a variation in the sensed charge signal meets a specified current variance. At block 808, a variation in an input current to a second charging circuit including a charge pump power converter is compensated for based on whether the sensed charge signal meets a specified current variance.

According to one aspect of the present disclosure, a wireless battery charging circuit is described. The wireless battery charging circuit includes means for compensating for a variation in the input current to the charge pump power converter. The compensating means may, for example, be the control unit 213, the buck switcher 210, the external sensor 230, the processor 104, the memory 106, and/or the PMIC 228. In another aspect, the aforementioned means may be any module or any apparatus or material configured to perform the functions recited by the aforementioned means.

Figure 9:
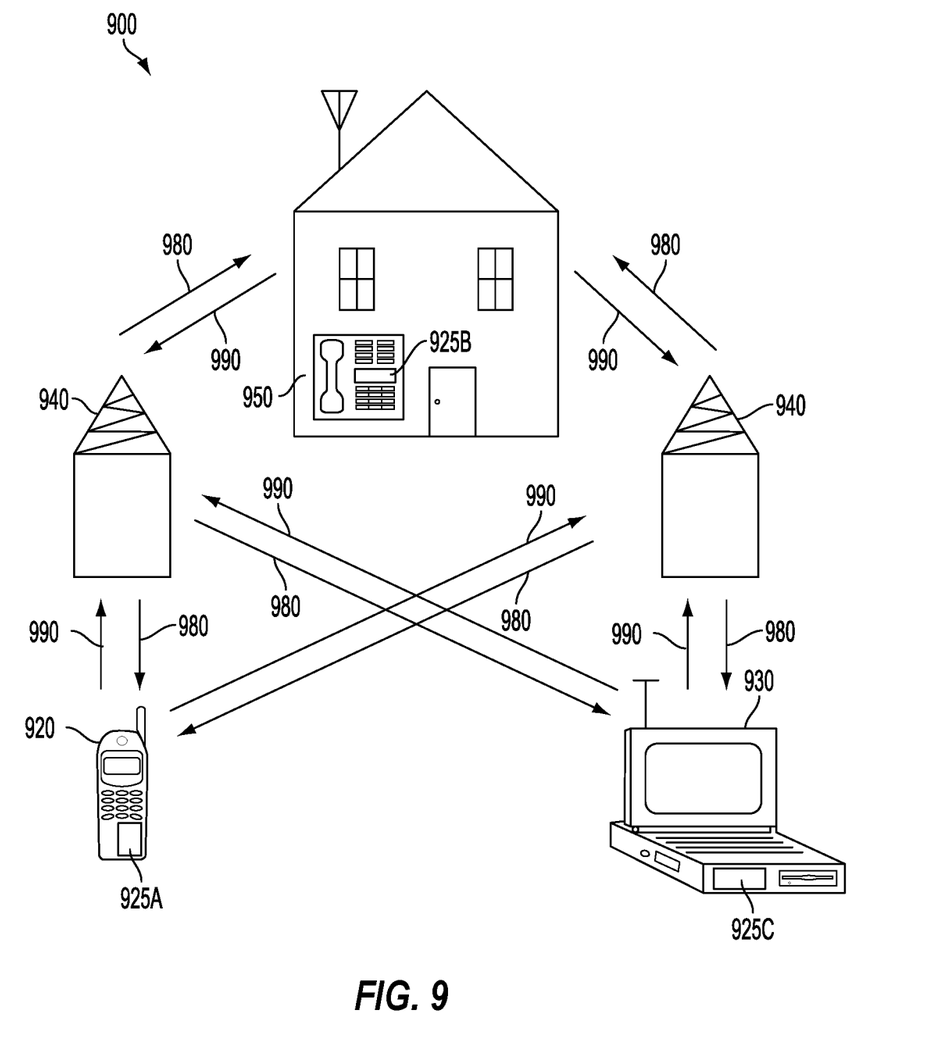
FIG. 9 is a block diagram showing an exemplary wireless communications system in which a configuration of the disclosure may be advantageously employed.

FIG. 9 is a block diagram showing an exemplary wireless communications system in which a configuration of the disclosure may be advantageously employed. For purposes of illustration, FIG. 9 shows three remote units 920, 930, and 950 and two base stations 940. It will be recognized that wireless communications systems may have many more remote units and base stations. Remote units 920, 930, and 950 include IC devices 925A, 925B, and 925C that include the disclosed wireless battery charging circuit. It will be recognized that other devices may also include the disclosed wireless battery charging circuit, such as the base stations, switching devices, and network equipment. FIG. 9 shows forward link signals 980 from the base station 940 to the remote units 920, 930, and 950 and reverse link signals 990 from the remote units 920, 930, and 950 to base station 940.

In FIG. 9, remote unit 920 is shown as a mobile telephone, remote unit 930 is shown as a portable computer, and remote unit 950 is shown as a fixed location remote unit in a wireless local loop system. For example, a remote unit may be a mobile phone, a hand-held personal communications systems (PCS) unit, a portable data unit such as a personal digital assistant (PDA), a GPS enabled device, a navigation device, a set top box, a music player, a video player, an entertainment unit, a fixed location data unit such as a meter reading equipment, or other communications device that stores or retrieves data or computer instructions, or combinations thereof. Although FIG. 9 illustrates remote units according to the aspects of the disclosure, the disclosure is not limited to these exemplary illustrated units. Aspects of the disclosure may be suitably employed in many devices, which include the wireless battery charging circuit.

For a firmware and/or software implementation, the methodologies may be implemented with modules (e.g., procedures, functions, and so on) that perform the functions described herein and in Appendix A. A machine-readable medium tangibly embodying instructions may be used in implementing the methodologies described herein and in Appendix A. For example, software codes may be stored in a memory and executed by a processor unit. Memory may be implemented within the processor unit or external to the processor unit. As used herein and in Appendix A, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein and in Appendix A, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein and in Appendix A. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

Although the present disclosure and its advantages have been described in detail, it should be understood that various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, and composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein and in Appendix A may be utilized according to the present disclosure. Accordingly, the appended claims are intended to include within their scope such processes, machines, manufacture, compositions of matter, means, methods, or steps.

What is claimed is:

1. A battery charging circuit comprising:
   a receiver configured to wirelessly receive charge signals for the battery charging circuit;
   a buck converter coupled to the receiver;
   a charge pump power converter coupled to the receiver and having an output coupled to an output of the buck converter for charging a battery;
   a sensor external to or internal to the battery charging circuit, the sensor coupled to the receiver and configured to sense a total input current; and
   a control unit configured to receive the total input current that is sensed and to compensate for a variation in an input current to the charge pump power converter based on whether the total input current that is sensed meets a specified current variance.

2. The battery charging circuit of claim 1, in which an input voltage terminal of the buck converter is coupled to an input voltage terminal of the charge pump power converter.

3. The battery charging circuit of claim 1, in which the sensor comprises an integrated current sensor.

4. The battery charging circuit of claim 1, in which the control unit further comprises a duty cycle adjustment device configured to adjust a buck duty cycle to adjust an input current to the buck converter to compensate for the variation in the input current to the charge pump power converter.

5. The battery charging circuit of claim 1, in which the buck converter comprises a multi-level buck converter, a charge pump, or a combination thereof.

6. The battery charging circuit of claim 1, in which the charge pump power converter comprises a multi-level buck converter, a charge pump, or a combination thereof.

7. A battery charging method, comprising:
   wirelessly receiving a charge current to charge a battery of a device;
   sensing the charge current;
   determining, at a buck converter, whether a variation in the charge current that is sensed meets a specified current variance; and
   compensating for the variation in an input current to a charge pump power converter having an output coupled to an output of the buck converter based on whether the charge current that is sensed meets the specified current variance.

8. The battery charging method of claim 7, in which compensating comprises adjusting an input current to the buck converter via an analog control loop to stabilize the charge current.

9. The battery charging method of claim 8, in which adjusting comprises reducing the input current to the buck converter when the charge current that is sensed is above the specified current variance.

10. The battery charging method of claim 8, in which adjusting comprises adjusting a buck duty cycle for the buck converter.

11. The battery charging method of claim 8, in which the buck converter comprises a multi-level buck converter, a charge pump, or a combination thereof.

12. The battery charging method of claim 8, in which the charge pump power converter comprises a multi-level buck converter, a charge pump, or a combination thereof.

13. A battery charging circuit comprising:
   a receiver configured to wirelessly receive charge signals for the battery charging circuit;
   a buck converter;
   a charge pump power converter having an output coupled to an output of the buck converter for charging a battery;
   a sensor external to or internal to the battery charging circuit, the sensor coupled to the receiver and configured to sense a total input current; and
   means for compensating for a variation in an input current to the charge pump power converter based on whether a received total input current that is sensed meets a specified current variance.

14. The battery charging circuit of claim 13, in which an input voltage terminal of the buck converter is coupled to an input voltage terminal of the charge pump power converter.

15. The battery charging circuit of claim 13, in which the sensor comprises an integrated current sensor.

16. The battery charging circuit of claim 13, in which the compensating means further comprises means for adjusting a duty cycle in order to adjust an input current to the buck converter to compensate for the variation in the input current to the charge pump power converter.

17. The battery charging circuit of claim 13, in which the buck converter comprises a multi-level buck converter, a charge pump, or a combination thereof.

18. The battery charging circuit of claim 13, in which the charge pump power converter comprises a multi-level buck converter, a charge pump, or a combination thereof.

* * * * *